No. 760,686. PATENTED MAY 24, 1904.
F. C. FURLOW.
LUBRICATING STUFFING BOX.
APPLICATION FILED SEPT. 25, 1903.
NO MODEL.

Witnesses:
Freda Schultz
Chas. H. Davids

Inventor,
Floyd C. Furlow,
By his Attorney,
Pierson L. Wells.

No. 760,686.

Patented May 24, 1904.

UNITED STATES PATENT OFFICE.

FLOYD C. FURLOW, OF PHILADELPHIA, PENNSYLVANIA.

LUBRICATING STUFFING-BOX.

SPECIFICATION forming part of Letters Patent No. 760,686, dated May 24, 1904.

Application filed September 25, 1903. Serial No. 174,626. (No model.)

*To all whom it may concern:*

Be it known that I, FLOYD C. FURLOW, of Philadelphia, Pennsylvania, have invented a certain new and useful Improvement in Lubricating Stuffing-Boxes, of which the following is a specification.

The present invention relates to a stuffing-box construction particularly designed for maintaining the continued and efficient lubrication of the rod or plunger encircled by the box. This result I accomplish by providing the device with a chamber for holding the lubricant, this chamber being open to the sliding surface of the plunger, so that the lubricant with which the chamber is charged may have access thereto. As a result a film of the lubricant (preferably grease) adheres to the plunger, lubricates the sliding metallic parts, and the packing as well, minimizes leakage, and prevents the corrosion of the plunger. I prefer also to combine with the device a wiper for removing any dust or dirt that may collect on the plunger, and thus prevent such material from being carried into the gland of the stuffing-box.

The various features of the present improvements are illustrated in the accompanying drawings, in which—

Figure 1:
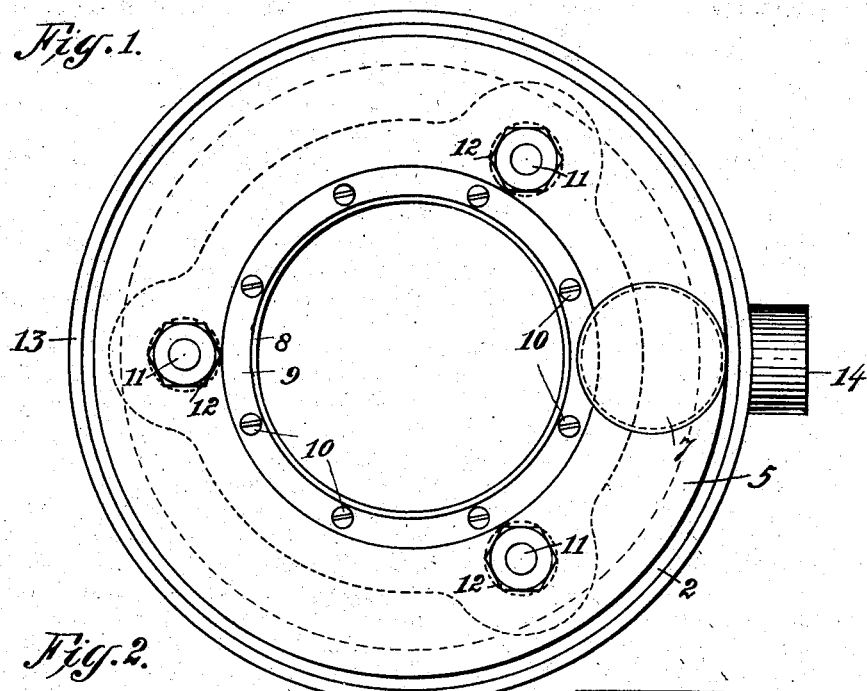
Figure 2:
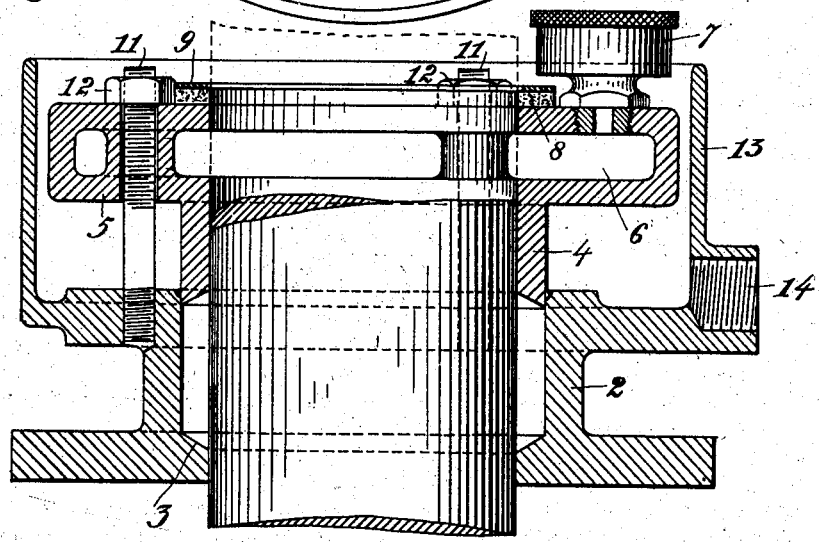

Figure 1 is a plan view of a stuffing-box construction embodying the present invention, and Fig. 2 is a longitudinal median section thereof.

Similar characters of reference designate like parts in both figures.

One of the most important features of the present improvements pertains to the provision, in a stuffing-box construction, of a lubricant-holding chamber or channel from which the lubricant (I prefer the use of grease) may pass to the periphery of the plunger or rod passing through the stuffing-box. Such chamber or channel is closed on all sides except that across which the surface of the plunger moves. The chamber thus becomes a compression-chamber, the grease in which upon being subjected to pressure is forced outward and adheres to the plunger. The said chamber or channel is in the preferred construction formed in the gland of the stuffing-box, and as the plunger passes inward the film of grease adhering thereto becomes effective to lubricate the packing.

The body of the stuffing-box (designated in the drawings by 2) may be of the desired form and proportions and obviously integral with or separate from the part (or a portion of the latter) into which leads the plunger or rod passing through the central opening in the box. The latter is here shown provided with the usual shoulder 3, between which and the end of the extending annular lip 4 of the gland 5 an annular space is formed for the reception of the packing. (Not shown.)

Adjacent to the outer end of the gland 5 there is provided a grease-holding chamber or channel 6, which it will be noted is closed in all directions except radially inward toward the bore of the gland. This chamber is designed for being charged with grease, preferably, which under pressure or when somewhat liquefied moves inward against the plunger and adheres thereto. Some means, such as a compression-cup 7 on the gland, may be used to supply the chamber with grease and put the latter under compression.

Preferably a wiper, such as a ring 8, of felt or other suitable material, is used for removing any excess of grease that may adhere to the plunger, as well as dirt, &c., likely to contaminate the grease on the inward movement of the plunger. The bore of this ring is sufficiently small to cause it to rub against the plunger, while it may be held in place by a keeper 9, secured in this instance by screws 10.

The clamping-bolts for the gland are indicated. They may consist of threaded studs 11, engaged with which are nuts 12, and the openings in the gland through which they may pass are so formed as not to form an exit for the grease.

The stuffing-box body may be provided with a guard, indicated in this instance as in the form of an upwardly-extending lip 13, for retaining any drip that may form and which may be lead off through suitable piping (not shown) connecting with the tapped opening 14.

Having described my invention, I claim—

1. A stuffing-box provided with a gland formed with a lubricant-holding pressure-chamber, combined with a compression-cup mounted on the gland, a wiper-ring on the outside of the gland and a keeper for holding the wiper-ring in place.

2. A stuffing-box provided with a gland having at its outer end a hollow laterally-extending holding-flange, combined with holding means engaging with the flange of the gland, and a lubricant-holder communicating with the interior space of said flange.

3. A stuffing-box provided with a gland having at its outer end a hollow laterally-extending holding-flange through which pass bolt-openings shut off from the space within the flange, holding-bolts passing through said openings, and a lubricant-holder communicating with the interior space of said flange.

4. A stuffing-box provided with a gland having at its outer end a hollow laterally-extending holding-flange, combined with holding means engaging with the flange of the gland, a lubricant-holder communicating with the interior space of said flange, and a wiper-ring completely encircling the rod-opening through the stuffing-box and secured to the outer face of said flange.

5. A stuffing-box provided with a gland having at its outer end a hollow laterally-extending holding-flange through which pass bolt-openings shut off from the space within the flange, holding-bolts passing through said openings, a lubricant-holder communicating with the interior space of said flange, and a wiper-ring completely encircling the rod-opening through the stuffing-box and secured to the outer face of said flange.

6. A stuffing-box having a body portion and provided with a gland having a hollow laterally-extending holding-flange, combined with a guard extending from said body portion and encircling said gland, holding means engaging with the flange of the gland, and a lubricant-holder communicating with the interior space of said flange.

7. A stuffing-box having a body portion and provided with a gland having a hollow laterally-extending holding-flange, combined with a guard extending from said body portion and encircling said gland, holding means engaging with the flange of the gland, a lubricant-holder communicating with the interior space of said flange, and a wiper-ring completely encircling the rod-opening in the stuffing-box and secured to the outer face of said flange.

8. The combination with a stuffing-box provided with a gland and formed with a lubricant pressure-chamber, of a wiper-ring completely encircling the rod-opening through the stuffing-box and contacting with the outer face of said gland, and a keeper-ring laid over said wiper-ring and screw-fastened to the gland.

9. In a stuffing-box, the combination with a body portion of a chambered gland through which pass openings shut off from the chamber in the gland, holding-bolts passing through said openings, a wiper-ring completely encircling the rod-opening through the stuffing-box and contacting with the outer face of said gland, a keeper-ring laid over said wiper-ring and screw-fastened to the gland, a compression-cup mounted on the gland, and a receptacle-forming guard extending from the said body portion, said receptacle having an opening for the engagement of a draining-conduit.

In testimony whereof I have hereunto signed my name to this specification in the presence of two subscribing witnesses.

FLOYD C. FURLOW.

Witnesses:
  ADA W. SUMERFIELD,
  WILLIAM R. LIEDIKE.